(12) United States Patent
Katoh et al.

(10) Patent No.: US 7,979,050 B2
(45) Date of Patent: Jul. 12, 2011

(54) PORTABLE ELECTRONIC APPARATUS, PROGRAM, AND COMMUNICATION SYSTEM

(75) Inventors: Makoto Katoh, Kawasaki (JP); Shousaku Suzuki, Machida (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1228 days.

(21) Appl. No.: 11/604,990

(22) Filed: Nov. 28, 2006

(65) Prior Publication Data

US 2007/0124074 A1  May 31, 2007

(30) Foreign Application Priority Data

Nov. 28, 2005 (JP) ................................. 2005-341539

(51) Int. Cl.
  *H04M 11/04* (2006.01)

(52) U.S. Cl. ................ 455/404.2; 455/414.1; 455/456.1

(58) Field of Classification Search ............... 455/404.1; 345/156; 382/124
See application file for complete search history.

(56) References Cited

U.S. PATENT DOCUMENTS

| 2003/0125010 A1* | 7/2003 | Jung ............................ 455/404 |
| 2005/0041841 A1* | 2/2005 | Yoo et al. ...................... 382/124 |

FOREIGN PATENT DOCUMENTS

| JP | 2003-078905 | 3/2003 |
| JP | 2003-217058 | 7/2003 |
| JP | 2004-072499 | 3/2004 |
| JP | 2004-355539 | 12/2004 |
| JP | 2006-177686 | 7/2006 |
| JP | 2006-304175 | 11/2006 |

* cited by examiner

*Primary Examiner* — Simon Sing
*Assistant Examiner* — Simon King
(74) *Attorney, Agent, or Firm* — Cohen Pontani Lieberman & Pavane LLP (57) ABSTRACT

A portable electronic apparatus is enabled to notify its position depending on whether user authentication by its authenticating function is unsuccessful or not, when an instruction for controlling the power of the apparatus is given.

A controlling unit determines by a condition determining function whether or not the user authentication by the authenticating function when the user gives a long pressing operation on a power key is unsuccessful or not. In a case where the authentication result coincides with a predetermined function, the controlling unit continues power supply to each element that constitutes a position notifying function. Even after the power is switched off, the position notifying function, which is kept operating, sends position information.

16 Claims, 11 Drawing Sheets

| Emergency Mode Flag | |
|---|---|
| Position Notifying e-mail Destination Address | mobile@casiohitachi.com |
| Position Notifying e-mail Sender Address | corporation@casiohitachi.com |
| Title of SUBJECT | Emergency Occurred: Current Position Notification |
| Name | Cellular T. Phone |
| Message | Current Position of<br>[ Name Inserted ]<br>(Portable Telephone Number 1234−5678−9012)<br>Is<br>[ Position Information Inserted ] |

| t1 | t2 |
|---|---|

| Tm0 | Tm1 | Tm2 |
|---|---|---|

Fig. 5

| To | company@work.co.jp |
|---|---|
| From | taro@work.co.jp |
| SUBJECT | Current Position Notification |

| Current Position of TARO NIHON<br>(Portable Telephone Number 1234−5678−9012)<br><br>Is<br><br>Latitude  134°  24' 30"<br>Longitude  35°  50' 12" |
|---|

PORTABLE ELECTRONIC APPARATUS, PROGRAM, AND COMMUNICATION SYSTEM

BACKGROUND OF THE INVENTION

1. Field of the Invention

The present invention relates to a portable electronic apparatus having a position notifying function for notifying its position, a program, and a communication system.

2. Description of the Related Art

There is a portable electronic apparatus (portable telephone apparatus) which has a function for sending information indicating its current position obtained by a GPS (Global Positioning System) receiving function.

The followings are known as the portable telephone apparatus of this type.

A portable telephone apparatus which has a function for sending information indicating its current position obtained by a GPS receiving function, and a shot image of the surrounding environments in an emergency mode (see Patent Literature 1: Unexamined Japanese Patent Application KOKAI Publication No. 2003-078905).

A portable telephone apparatus which sends information indicating its current position obtained by a GPS receiving function, personal information (name, address, etc.), an image shot at that time, and an emergency message by means of an e-mail to an e-mail address, when an emergency occurs (see Patent Literature 2: Unexamined Japanese Patent Application KOKAI Publication No. 2004-355539).

The position notifying function of the portable telephones disclosed in the Patent Literatures 1 and 2 works only when the power of the portable telephones is on. Therefore, when the user switches off the power of the portable telephone, the function for sending the position information also stops.

Not only the portable phones, but also electronic apparatuses of various types that have the position notifying function suffer the same problem.

SUMMARY OF THE INVENTION

An object of the present invention is to provide an electronic apparatus capable of notifying its position even after the power is switched off, a program, and a communication system.

To achieve the above object, a portable electronic apparatus according to the present invention is a portable telephone apparatus having a position notifying function, and comprising:

a position detecting unit which detects a position of the portable electronic apparatus;

a sending unit which sends position information indicating the position detected by the position detecting unit;

a power off instructing unit which instructs switching off a power of the portable electronic apparatus;

an authenticating unit which authenticates a user; and a controlling unit which performs control such that the authenticating unit authenticates the user when the power off instructing unit instructs switching off the power, and the position detecting unit and the sending unit continue operating in a case where a result of authenticating coincides with a predetermined condition.

To achieve the above object, there is further provided a program for allowing a computer to realize the principal functions of the present invention.

To achieve the above object, a communication system according to the present invention comprises a mobile communication network having a plurality of base stations and a telephone exchange, and a portable electronic apparatus which communicates with another apparatus through the mobile communication network, wherein the portable electronic apparatus comprises: a base station determining unit which determines with which base station the portable electronic apparatus establishes communication; a sending unit which sends information for specifying the portable electronic apparatus to the base station determined by the base station determining unit; a power off instructing unit which instructs switching off a power of the portable electronic apparatus; an authenticating unit which authenticates a user; and a controlling unit which controls the authenticating unit to authenticate the user when the power off instructing unit instructs switching off the power, and controls the base station determining unit and the sending unit to continue operating when a result of authenticating coincides with a predetermined condition, wherein the base station comprises a unit which provides and registers to the telephone exchange, identification information of a portable electronic apparatus which establishes communication with the base station, and wherein in a case where authentication done when switching off the power is instructed ends in failure, the portable electronic apparatus continues an operation of registering its position to the telephone exchange even after the power is switched off.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

The first embodiment of the present invention will be explained below with reference to FIG. 1 to FIG. 6.

The first embodiment shows an example that a portable telephone apparatus is adopted as a portable electronic apparatus and whether or not user authentication by an authenticating function ends in failure is determined by fingerprint authentication.

Figure 1:
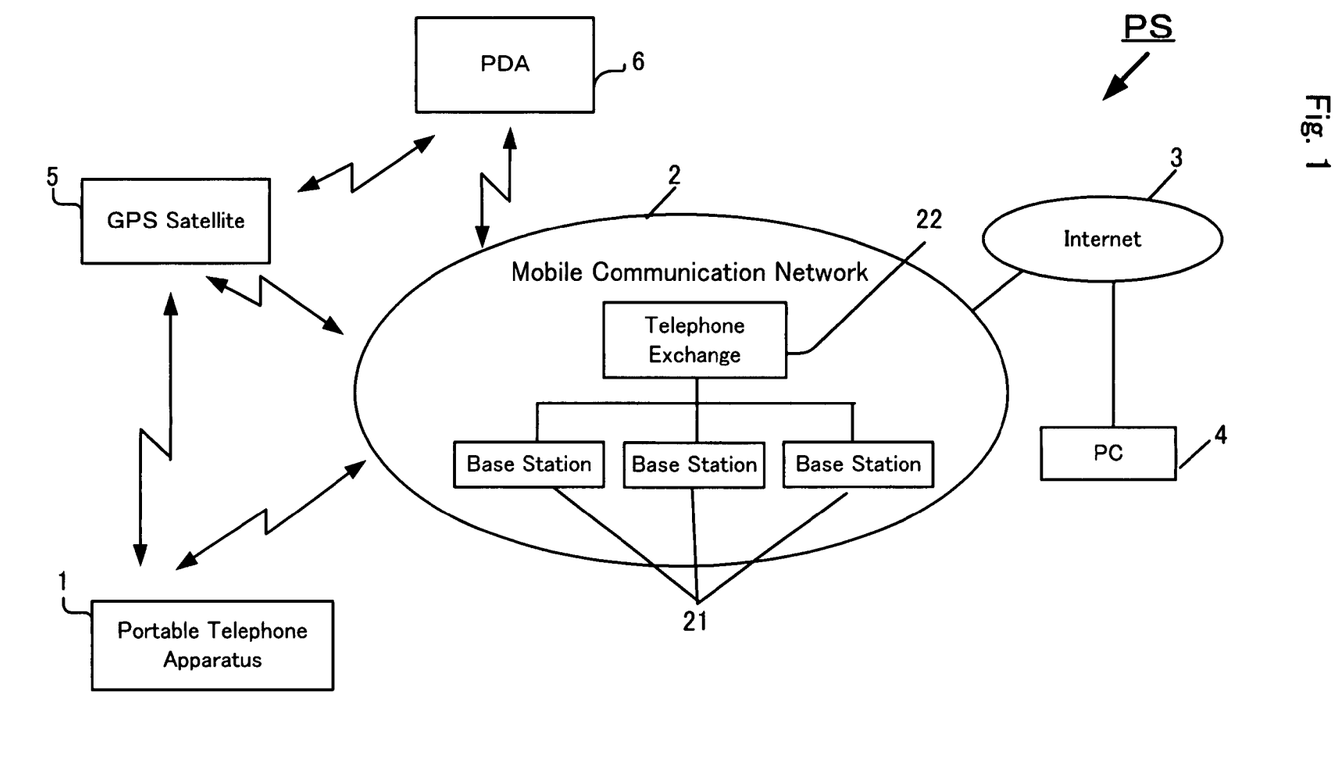
FIG. 1 is a block diagram showing the entire configuration of a position notifying system PS utilizing a portable electronic apparatus (a portable telephone apparatus 1, a PDA 6)

As shown in FIG. 1, a position notifying system PS involving the use of a portable electronic apparatus comprises a portable telephone apparatus 1, a mobile communication network 2, Internet 3, a PC (Personal Computer) 4, a GPS satellite 5, a PDA (Personal Digital Assistant) 6, and a portable telephone apparatus 7.

Figure 2A:
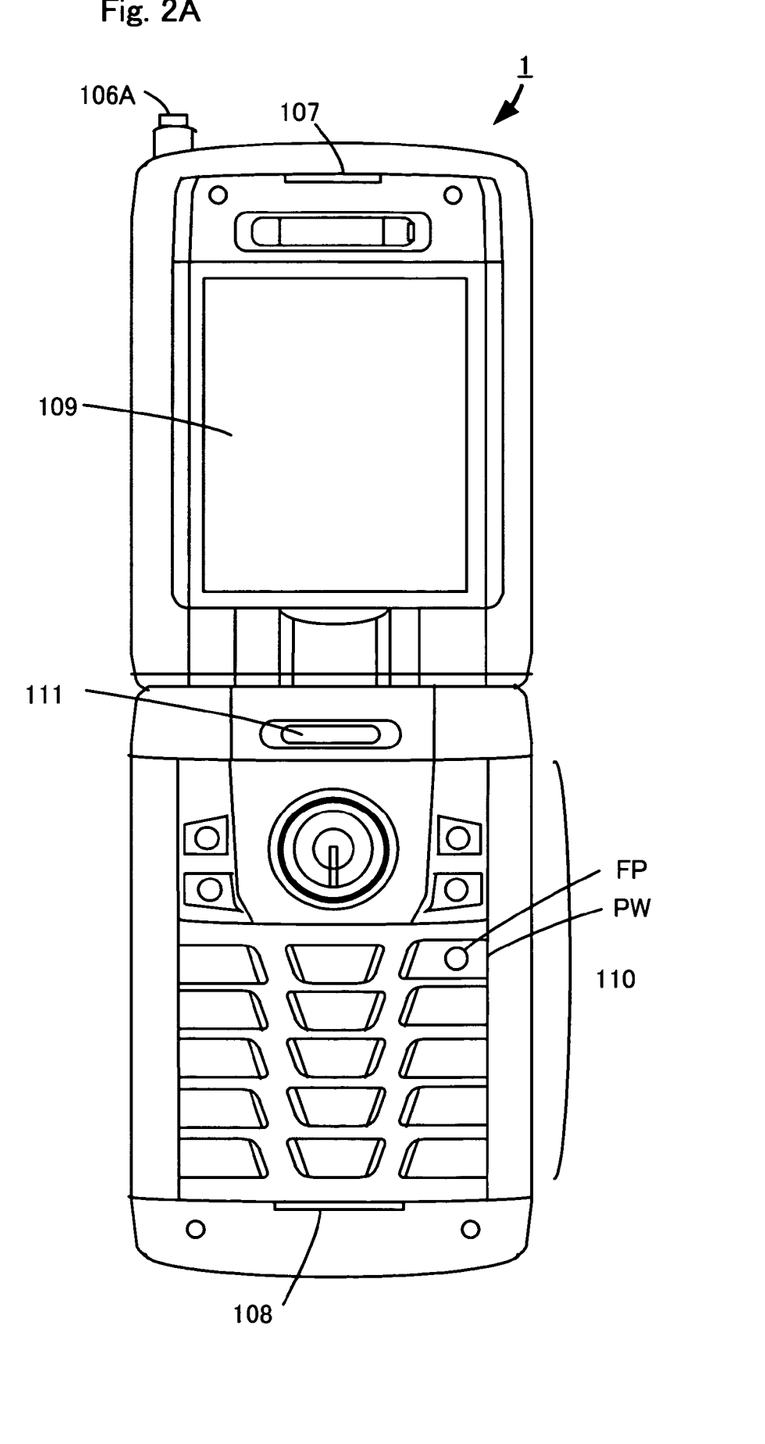
FIG. 2A is an appearance diagram showing the front view of the portable telephone apparatus 1 when the apparatus 1 is opened.
Figure 2B:
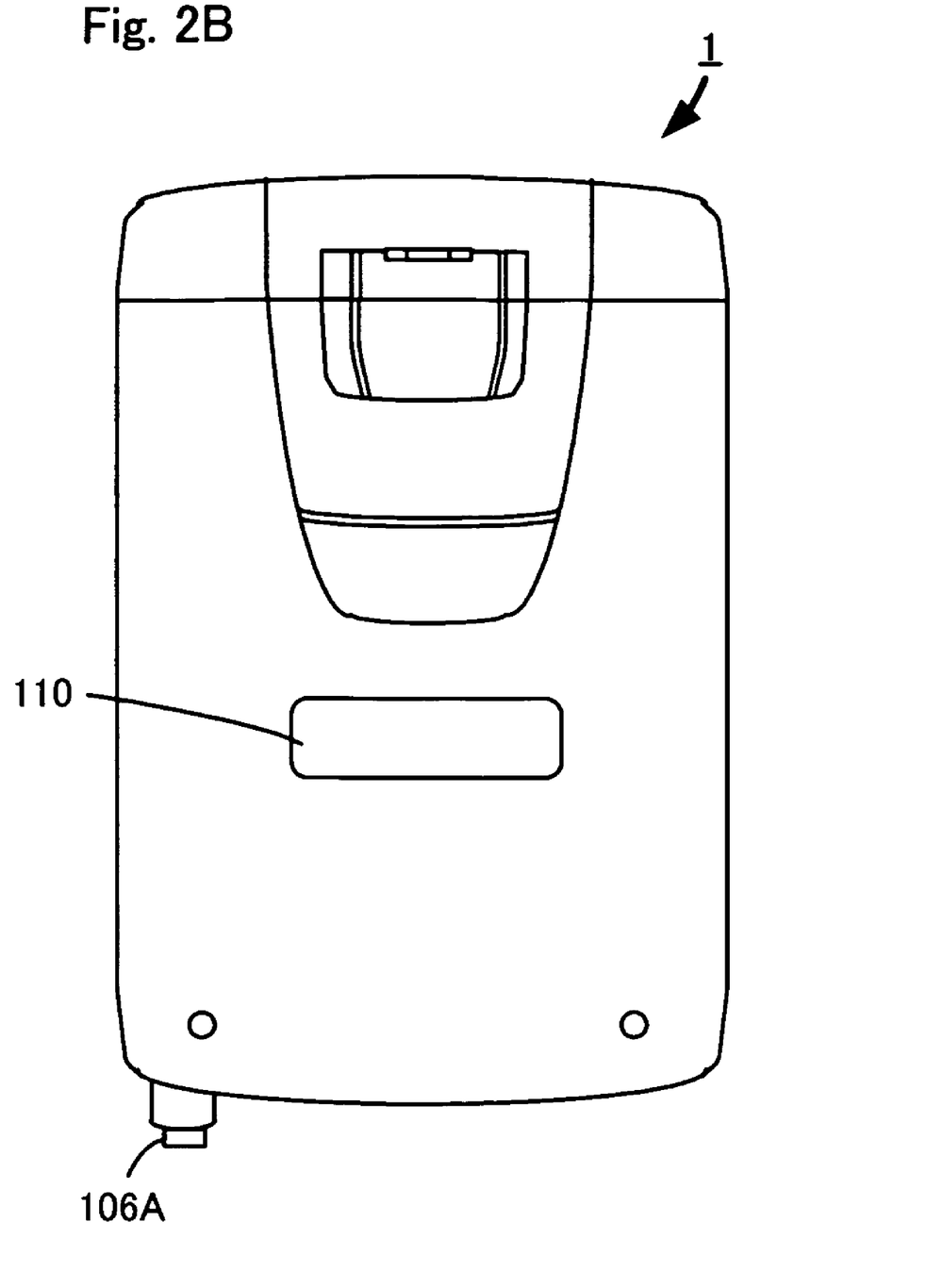
FIG. 2B is an appearance diagram showing the back view of the portable telephone apparatus 1 when the apparatus 1 is closed.

When the portable telephone apparatus 1 is opened, an antenna 106A, an audio speaker 107, an audio microphone 108, a main display section 109, and an alerting unit 111, which are to be described later, are seen on the front view of the apparatus 1, as shown in FIG. 2A. When the portable telephone apparatus 1 is closed, the antenna 106A and a sub display section 110 are shown on the back view of the apparatus 1, as shown in FIG. 2B.

The portable telephone apparatus 1 has the same functions as a general portable telephone apparatus.

Further, the portable telephone apparatus 1 has some functions unique to the present embodiment, namely i) a function for receiving a positioning signal sent from the GPS satellite 5, determining the current position of the apparatus 1 based on the positioning signal, and generating position information, ii) a function for sending the generated position information to a predetermined PC 4 or portable telephone apparatus 7 at the receiver side through the Internet 3, iii) a function for registering the position information to a telephone exchange 22 through a base station 21, etc.

Figure 3:
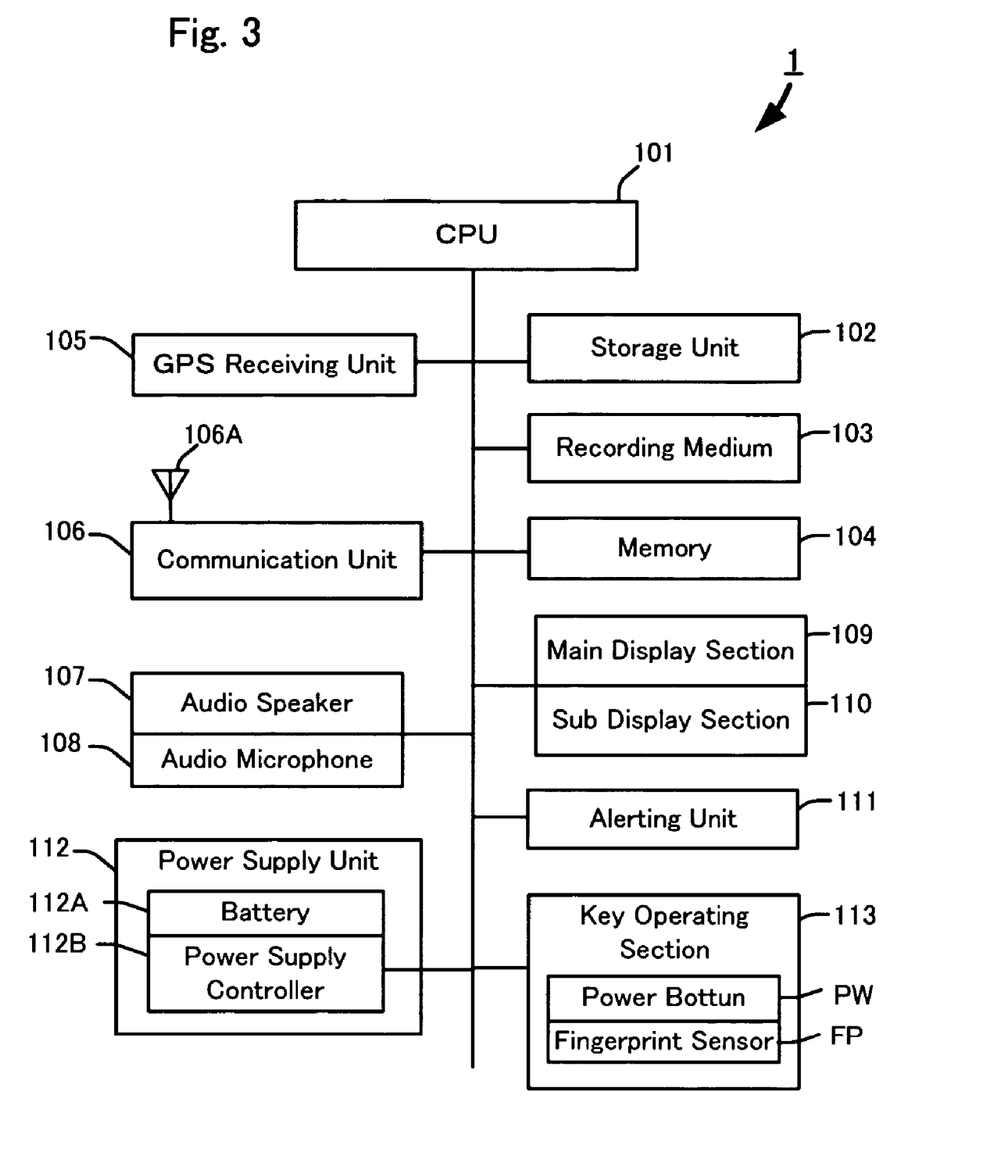
FIG. 3 is a block diagram showing basic elements of the portable telephone apparatus 1.

To realize these functions, the portable telephone apparatus 1 physically comprises a CPU 101, a storage unit 102, a recording medium 103, a memory 104, a GPS receiving unit 105, a communication unit 106, the antenna 106A, the audio speaker 107, the audio microphone 108, the main display section 109, the sub display section 110, the alerting unit 111, a power supply unit 112, and a key operation section 113, as shown in FIG. 3.

The CPU (Central Processing Unit) 101 controls general operations of the entire portable telephone apparatus 1, and realizes logical functions such as a condition determining function, a power supply controlling function, a current position notifying mode setting function, a position notification controlling function, etc. which are unique to the present embodiment, in accordance with an operation program stored in the storage unit 102.

The storage unit 102 is an internal memory comprising a non-volatile memory such as a flash memory. The storage unit 102 has a program area and a data area.

In the program area, a program for realizing a process shown in the flowchart of FIG. 6 to be described later is stored.

In the data area, an unillustrated address book for storing e-mail addresses, etc. is prepared, and a fingerprint pattern of a proper user used for user authentication is pre-registered. In the address book, the address (predetermined address) of the destination to which the current position of the portable telephone apparatus 1 is notified in a later-described current position notifying mode is registered, as shown in FIG. 4.

Figure 4:
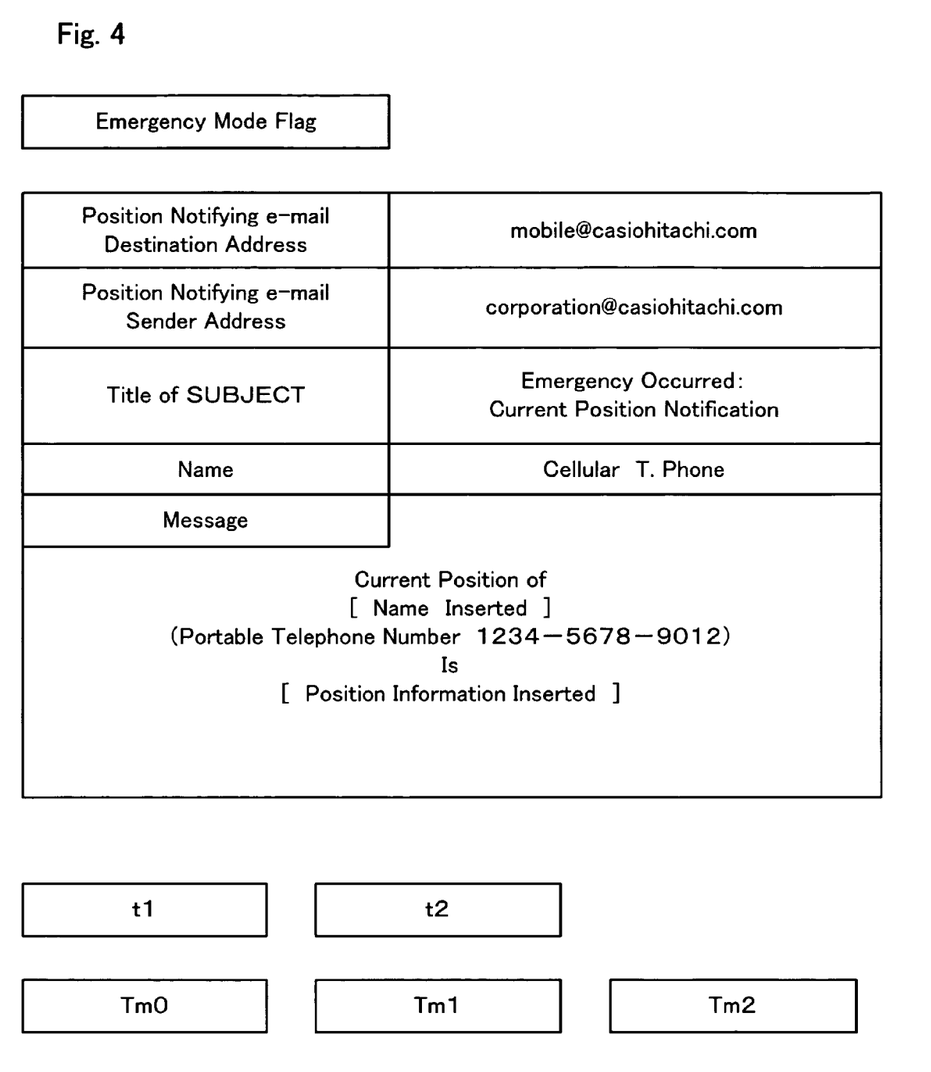
FIG. 4 is a diagram showing the image of operation controlling flags and operation setting information, which are stored in a data area of a storage unit 102 of the portable telephone apparatus 1.

Further, in the data area, operation controlling flags and operation setting information are also stored, as shown in FIG. 4. The flags include an operation flag for setting an operation mode (referred to as "current position notifying mode") in which the GPS receiving unit 105 obtains the current position and the communication unit 106 notifies the current position to the predetermined address even if the power is switched off. The operation setting information includes a value set as a later-described position information sending period Tm, a time TmN (N being an integer) at which position information is sent, a value of a later-described position registration response period t1 in case of the power being on, and a value of a later-described position registration response period t2 in case of the power being off.

The recording medium 103 is a detachable carryable memory, and comprises, for example, a smart media, an IC card, or the like. The recording medium 103 stores data representing images shot by an unillustrated camera.

The memory 104 functions as a work memory of the CPU 101, and comprises, for example, a DRAM (Direct Random Access Memory), an SDRAM (Synchronous DRAM), or the like.

The GPS receiving unit 105 receives positioning signals sent from a plurality of GPS satellites 5 of FIG. 1, and finds the current position (longitude and latitude information) based on the phase difference of the positioning signals. The method of finding the position is arbitrary, and known arbitrary methods can be used.

Though the current position is determined with the use of GPS according to the first embodiment, the position may be found from the intensity of radio waves sent from a plurality of base stations 21 which are adjacent.

The communication unit 106 modulates or demodulates audio signals and data, and sends or receives modulated audio signals and data to and from the mobile communication network 2 and Internet 3, through the antenna 106A.

The audio speaker 107 outputs a demodulated audio.

The audio microphone 108 receives an input audio.

A screen display section comprises the main display section 109 and the sub display section 110. The main display section 109 comprises an LCD (Liquid Crystal Display) or the like, and displays character information, messages of various kinds, etc. with a high quality. The sub display section 110 is provided at the back surface of the portable telephone apparatus 1, and displays the current date and time, brief messages, icons, etc.

The alerting unit 111 comprises a speaker, an LED (Light Emitting Diode), and a vibration motor, and notifies the reception of a call or an e-mail when it receives it. Further, the alerting unit 111 is driven for giving an alert for the occurrence of an emergency, when, for example, it is determined that the authenticating function fails in authenticating the user.

The power supply unit 112 comprises a battery 112A and a power supply controller 112B. The power supply controller 112B supplies power to each element of the portable telephone apparatus 1 when the power of the apparatus 1 is on, in accordance with an instruction from the power supply controlling function of the CPU 101. When the power is off, the power supply controller 112B supplies standby power to the CPU 101 and the key operation section 113.

In the current position notifying mode, the power supply controller 112B supplies operation power to the CPU 101, the key operation section 113, the GPS receiving unit 105, and the communication unit 106, even when the power is off.

The key operation section 113 comprises keys or buttons of various types for inputting instructions and data. These keys or buttons include a power key PW for power supply control.

When the power key PW is depressed by the user continually for a predetermined time (referred to as "long pressing operation"), the key operation section 113 detects the long pressing operation and supplies a nonmaskable power supply control interrupt signal to the CPU 101 through a bus. In response to this power supply control interrupt signal, the CPU 101 sends an instruction to the power supply controller 112B to control power supply to each element.

The power key PW comprises a later-described fingerprint sensor (reading device) FP on its key top. The fingerprint sensor FP includes a touch sensor for sensing a touch by a finger of the user, and a reading unit of an image reader for acquiring the fingerprint of the user in the form of an image.

Next, the operation of the portable telephone apparatus 1 will be explained, by focusing mainly on its characteristic portions, with reference to FIG. 6.

A characteristic of the operation of the present portable telephone apparatus 1 lies in that under a certain condition, the power supply to the main display section 109 and sub display section 110 is stopped when the power is switched off to disguise the portable telephone apparatus 1 as if its power were switched off, but the function for notifying the current position by an e-mail is maintained. The other operations of the portable telephone apparatus 1 are the same as those of a general portable telephone apparatus.

As a premise, the user performs a long pressing operation of the power key PW by controlling the key operation section 113 where necessary. Further, the user can set either on or off the flag for the current position notifying mode by means of the current position notifying mode setting function, through an input from the key operation section 113. In the default state, the current position notifying mode is set on.

In a case where the current position notifying mode is set on, when the power key PW is pressed long, the CPU 101 reads the result of user authentication by using the condition determining function and determines whether or not the user authentication by the authenticating function is unsuccessful.

In a case where the user authentication by the authenticating function is unsuccessful, the CPU 101 sends an instruction to the power supply controller 112B by using its power supply controlling function to control power supply to each element.

The position notification controlling function of the CPU 101 sends position information obtained based on a positioning signal received by the GPS receiving unit 105 to a predetermined destination, and registers the position information in an unillustrated position managing database of the telephone exchange 22 through a base station 21.

Figure 5:
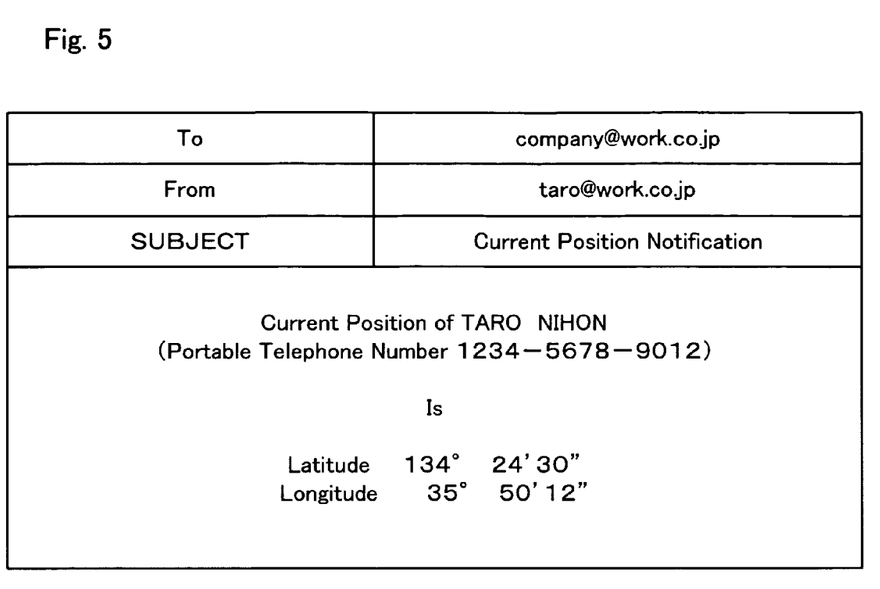
FIG. 5 is a diagram showing an example of the content of an e-mail including position information, generated by a position notification controlling function of the portable telephone apparatus 1.

Further, in the case where the user authentication by the authenticating function is unsuccessful, the position notification controlling function reads out the e-mail address of the destination which is pre-designated as the contact address in case of emergency, generates an emergency e-mail as shown in, for example, FIG. 5, which includes the "current position", "name", "emergency message", etc., and sends the emergency e-mail to the e-mail address read out.

In the current position notifying mode, a timer function of the CPU 101 measures how much time elapses after the time TmN (N being an integer) at which the position information is sent or after the time at which the position information is registered, in order to detect the elapse of the position information sending period Tm and the position registration response period t2.

An image display controlling function of the CPU 101 sends a screen off control signal to the main display section 109 and sub display section 110 to control the screen to be in a non-display state (referred to as "sleep state"), when the user operates no key for a predetermined period of time.

The flowchart of the portable telephone apparatus 1 is started when the key operation section 113 detects a long pressing operation on the power key PW, and a nonmaskable power supply control signal is sent to the CPU 101.

Figure 6:
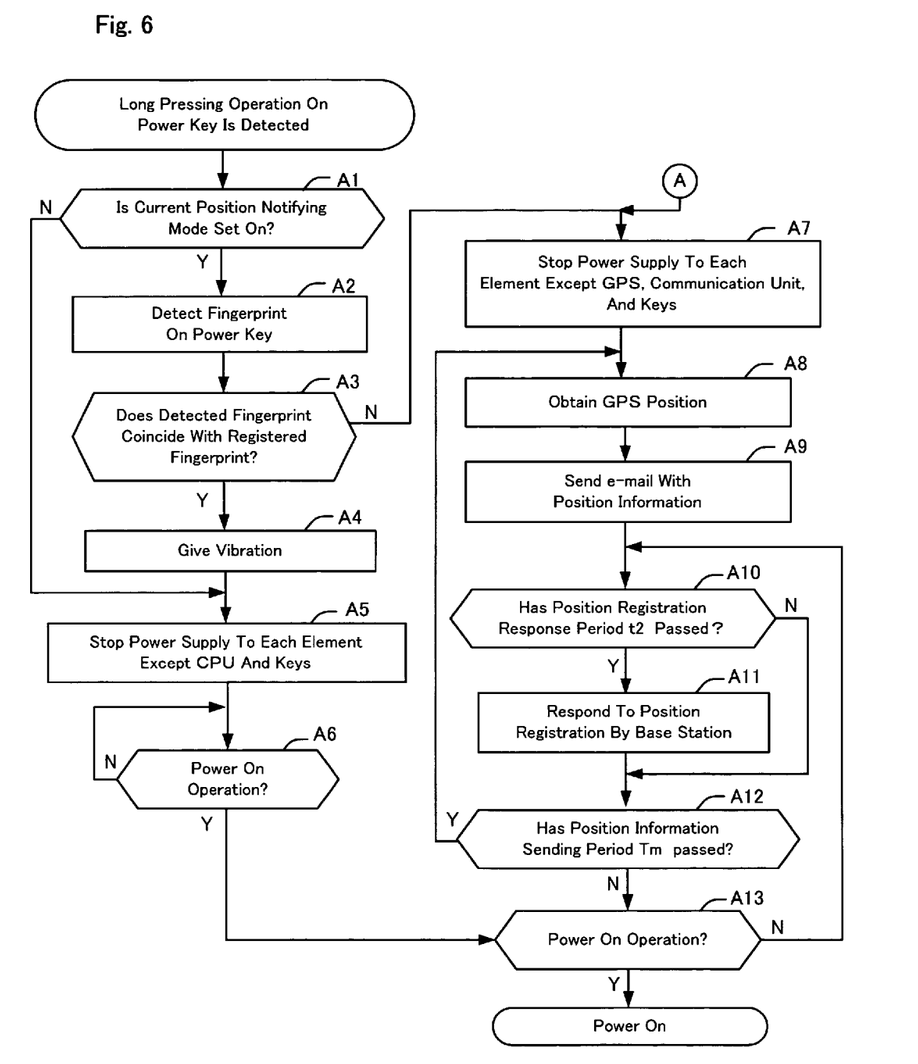
FIG. 6 is a flowchart showing an operation of the portable telephone apparatus 1 according to a first embodiment.

When the process of the flowchart of FIG. 6 is started, first, the CPU 101 determines whether the current position notifying mode is on or off (step A1).

In a case where the current position notifying mode is off (step A1; NO), the CPU 101 supplies a power supply control signal to the power supply unit 112 and stops power supply (referred to as "power off") to each element except the CPU 101 and key operation section 113, in order to stop the functions other than a power on function and the timer function (step A5). After this, the CPU 101 enters a standby state waiting for a power on operation (step A6).

To the contrary, in a case where the current position notifying mode is on (step A1; YES), the CPU 101 detects the fingerprint of the user which is given by the long pressing operation on the power key PW, from the fingerprint sensor FP provided on the key top of the power key PW (step A2). Since the user operates the power key PW which is equipped with the fingerprint sensor FP, he/she is subjected to the authentication only by operating the power key PW without operating a plurality of keys.

After this, the condition determining function acquires the fingerprint pattern, reads out the pre-registered fingerprint pattern and compares them against each other, thereby performing the authentication of the user. In a case where the fingerprint patterns coincide with each other, the condition determining function determines that the user authentication by the authenticating function is successful (step A3; YES). At this time, the CPU 101 drives the vibration motor provided in the alerting unit 111 to notify that the authentication ends in success by the vibration function (step A4). Then, the power supply controlling function stops power supply to each element except the CPU 101 and key operation section 113 to maintain the operations of the power on function and timer function (step A5), and the CPU 101 waits for the user to give a power on operation (step A6).

To the contrary, in a case where the user authentication by the authenticating function is unsuccessful (step A3; NO), the CPU 101 performs the processes of steps A7 and A8 to move on to the current position notifying mode. In this case, no notification is given by the vibration function of the alerting unit 111. That is, since different notifying manners are taken depending on whether or not the user authentication by the authenticating function is unsuccessful, the user can be notified whether or not it is possible to perform position notification.

When the flow moves to the current position notifying mode, the power supply controlling function sends a power off signal to the power supply controller 112B (step A7). Here, the power supply controlling function continues the power supply to the GPS receiving unit 105, the communication unit 106, the CPU 101, and the key operation section 113 so that the operations of the GPS receiving function and position notifying function may be maintained in addition to the power on function and timer function. On the other hand, the power supply to the other elements than the GPS receiving unit 105, the communication unit 106, the CPU 101, and the key operation section 113 is stopped. As a result, since the power supply to the main display section 109 and sub display section 110 is also stopped, the portable telephone apparatus 1 seemingly pretends a power off state, and what is more, the battery consumption of the portable telephone apparatus 1 can be saved.

In the current position notifying mode in which the operations of a position detecting function and the position notifying function are maintained, the CPU 101 obtains the current position by using a positioning signal received by the GPS receiving unit 105 (step A8). The position notification controlling function reads out the e-mail address of the destination which is pre-designated as the contact address in case of emergency, generates an emergency e-mail as shown in, for example, FIG. 5, which includes "current position", "name", "emergency message", etc., and sends the emergency e-mail to the destination read out (step A9). This enables the receiver of the position information to track the position of the portable telephone apparatus 1.

After this, the CPU 101 determines whether or not a predetermined period (position registration response period t2) has passed since the previous position registration, by the timer function (step A10). In this case, the relationship between the position registration response period "t1" in case of the power being on and the position registration response period "t2" in the current position notifying mode in which the operations of the position detecting function and position notifying function are maintained is t2>t1. The value of the position registration response period t2 is set in consideration of battery consumption, etc. However, if t2 is set extremely longer like t2>>t1, the notifying interval becomes too discrete. Therefore, the position registration response period t2 is set to, for example, about 1.5 to 2 times longer than t1. That is, in the current position notifying mode, it is possible to register the positions while saving the power consumption.

In a case where the position registration response period t2 has not passed (step A10; NO), the CPU 101 moves the process to step A12. However, in a case where the elapse of the position registration response period t2 is detected (step A10; YES), the CPU 101 sends an instruction to the communication unit 106 to emit a radio wave from the antenna 106A, and responds to the position registration by a nearby base station 21 (step A11). Thereby, the position of the base station 21 which emits the strongest radio wave is registered to the telephone exchange 22 as the position of the portable telephone apparatus 1.

Next, it is determined whether or not a predetermined period (position information sending period Tm) has passed since the previous sending of the emergency e-mail (step A12).

In a case where the position information sending period Tm has not yet passed (step A12; NO), the flow moves to step A13, and the CPU 101 checks whether or not a power on operation is given. In a case where the power off state is kept, the flow returns to step A10 and the CPU 101 waits until the position registration response period t2 or the position information sending period Tm has passed.

In a case where the timer function detects the elapse of the position information sending period Tm (step A12; YES), the position notification controlling function obtains the current position from the GPS receiving unit 105 (step A8), and sends an emergency e-mail including the current position to the destination (step A9). Thereafter, the CPU 101 repetitively responds to the position registration each time the position registration response period t2 passes, and repetitively sends an emergency e-mail each time the position information sending period Tm passes. That is, the receiver at the predetermined destination can track the position of the portable telephone apparatus 1 once in each predetermined period of time.

Accordingly, in a case where the user authentication by the authenticating function is unsuccessful, the position notifying function operates even after the power is switched off so that the position of the portable telephone apparatus 1 may be repetitively notified at predetermined regular time intervals.

Further, since the power supply controlling function stops the power supply to the display sections 109 and 110 to bring the screen into a non-display state, the portable telephone apparatus 1 seemingly disguises the power off state while the position notifying function works secretly. Accordingly, even if an improper user gives a power off operation, the portable telephone apparatus 1 can notify its positions after such an event, without the improper user noticing it, and the receiver of the position information can track the position of the portable telephone apparatus 1.

Second Embodiment

The second embodiment of the present invention will be explained below with reference to FIG. 1 and FIG. 7.

In the first embodiment, whether or not a predetermined operation to the power is given or not is determined by fingerprint authentication as one of biometrics. The second embodiment shows an example that whether or not the user authentication is unsuccessful is determined by password authentication.

According to the second embodiment, a password used for the user authentication is pre-registered in the data area of the storage unit 102.

The flowchart of the portable telephone apparatus 1 according to the second embodiment is started when the key operation section 113 detects a long pressing operation on the power key PW and a nonmaskable power supply control signal is sent to the CPU 101.

Figure 7:
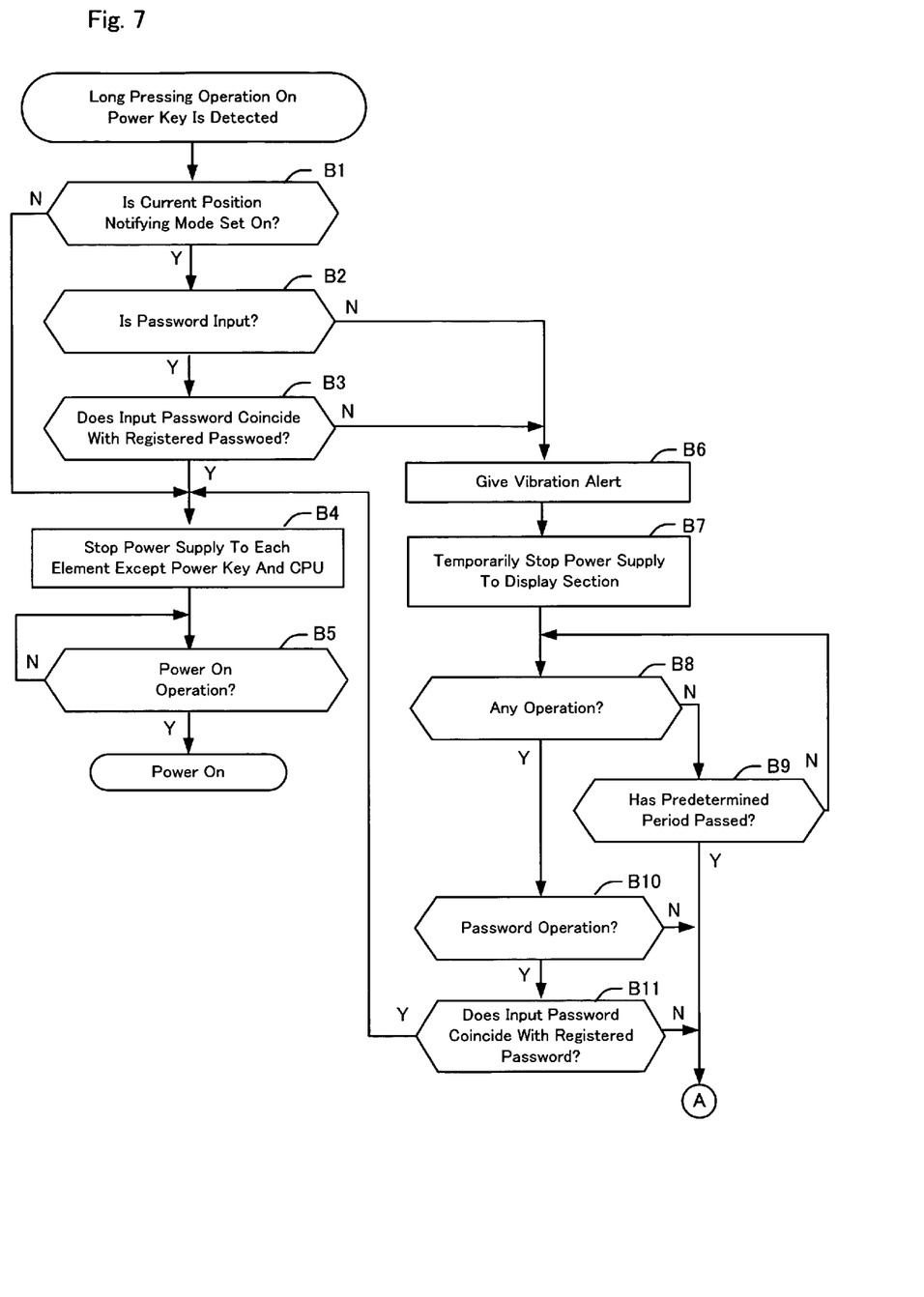
FIG. 7 is a flowchart showing an operation of the portable telephone apparatus 1 according to a second embodiment.

When the process of the flowchart of FIG. 7 is started, first, the CPU 101 determines whether or not the current position notifying mode is on or off (step B1). In a case where the current position notifying mode is not on (step B1; NO), the power supply controlling function switches off the power (step B4). After this, the CPU 101 waits for the user to give a power on operation (step B5).

To the contrary, in a case where the current position notifying mode is on (step B1; YES), the condition determining function determines whether or not the user inputs a password (step B2). In a case where the user does not input a password (step B2; NO), the flow moves to step B6. To the contrary, in a case where the user inputs a password (step B2; YES), the condition determining function acquires the input password, reads out the pre-registered password, compares the passwords to authenticate the user, and determines whether or not the user authentication by the authenticating function is unsuccessful (step B3).

In a case where the passwords coincide with each other and the user authentication by the authenticating function is successful (step B3; YES), the power supply controlling function switches off the power (step B4). After this, the CPU 101 waits for the user to give a power on operation (step B5).

In the case where the user does not input a password (step B2; NO), or in a case where the password input by the user does not coincide with the registered password (step B3; NO), the CPU 101 drives the vibration motor provided in the alerting unit 111 to give an alert by the vibration function (step B6).

After this, the power supply controlling function temporarily stops the power supply to the main display section 109 and sub display section 110 (step B7). Thereby, the portable telephone apparatus 1 seemingly disguises the power off state.

Here, the CPU 101 determines whether or not there is any key operation on the key operation section 113 (step B8). In a case where the user gives no key operation (step B8; NO), the timer function checks whether or not a predetermined period (for example, 20 seconds) has passed since the long pressing operation on the power key PW was given (step B9), and if no, the CPU 101 returns to step B8 to wait for the predetermined period to pass.

In a case where the user gives a key operation before the predetermined period passes (step B8; YES), the condition determining function determines whether or not the user's operation is re-inputting of a password (step B10).

In a case where a password is re-input (step B10; YES), the condition determining function reads out the password pre-registered in the data area of the storage unit 102 to perform the user authentication (step B11). If the re-input password coincides with the registered password (step B11; YES), the condition determining function determines that the user authentication by the authenticating function results in success, and the power supply controlling function stops the power supply to each element (step B4). In this case, the CPU 101 cancels the alert by vibration.

However, in a case where the user does not re-input a password even after the predetermined period has passed (step B9; YES), or in a case where the password re-input by the user does not coincide with the registered password (step B11; NO), the CPU 101 performs the processes of steps A7 to A13 of FIG. 6, likewise the first embodiment. That is, in the current position notifying mode, the position notification controlling function repetitively notifies the position information.

According to the second embodiment, the condition determining function performs the user authentication by comparing the pre-registered password with the password which the user inputs after the long pressing operation on the power key PW. Therefore, likewise the first embodiment, whether the user is proper or improper is securely determined.

Further, in a case where the user authentication by the authenticating function is unsuccessful, the alerting unit 111 gives an alert by the vibration function to notify the user of the fact. If the user inputs a proper password before a predetermined period (for example, 20 seconds) passes since this alert was given, the CPU 101 stops the power supply to each element and cancels the vibration alert. Therefore, in a case where the user inputs a wrong password by mistake, he/she can immediately correct the error.

Further, if the user does not input the registered password after the vibration alert, the position notification controlling function gives a notification of an emergency, which means there is a high possibility of an occurrence of an emergency.

Third Embodiment

The third embodiment of the present invention will be explained with reference to FIG. 1 and FIG. 8.

According to the first and second embodiments, in a case where the user authentication by the authenticating function is unsuccessful, the position notifying function notifies the position information even after the user presses the power key PW long.

On the other hand, according to the third embodiment, in a case where the user authentication by the authenticating function ends in success, the position notifying function notifies the position information even after the user presses the power key PW long.

Further, according to the third embodiment, the condition determining function determines whether or not the user authentication by the authenticating function is unsuccessful, based on whether or not the user presses the power key PW together with a special key (for example, a call button) simultaneously.

Figure 8:
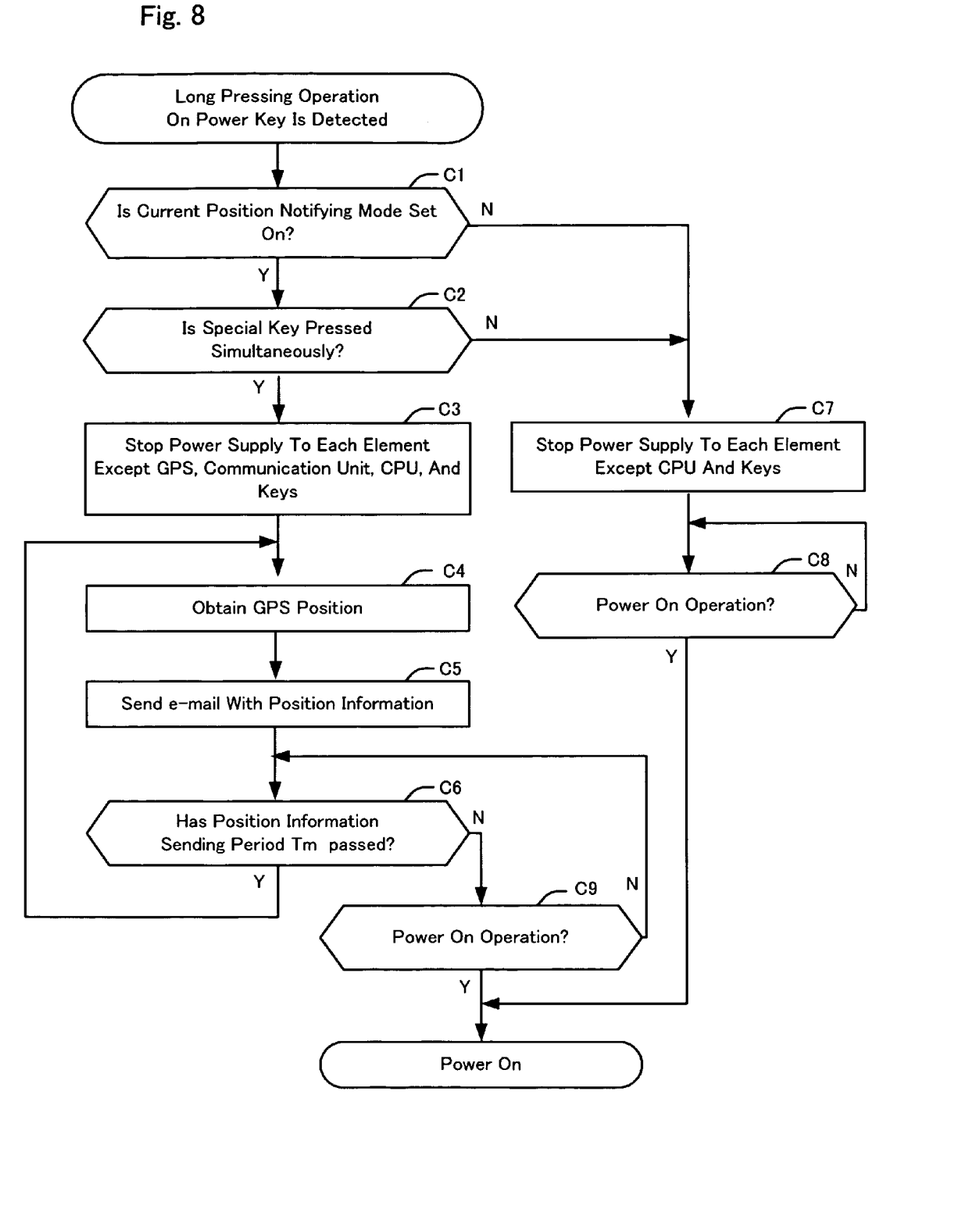
FIG. 8 is a flowchart showing an operation of the portable telephone apparatus 1 according to a third embodiment.

The flowchart of the third embodiment is started when the key operation section 113 detects a long pressing operation on the power key PW and a nonmaskable power supply control signal is sent to the CPU 101, as shown in FIG. 8.

When the process of the flowchart of FIG. 8 is started, first, the CPU 101 determines whether or not the current position notifying mode is on or off (step C1). In a case where the current position notifying mode is not on, the power supply controlling function switches off the power (step C7), and the CPU 101 waits for the user to switch on he power (step C8).

In a case where the current position notifying mode is on, the condition determining function determines whether or not the user authentication by the authenticating function is unsuccessful, based on whether or not the power key PW and the special key (for example, a call button) are pressed simultaneously (step C2).

In a case where the power key PW and the special key are not pressed simultaneously (step C2; NO), the power supply controlling function switches off the power (step C7), and thereafter the CPU 101 waits for the user to switch on the power (step C8).

To the contrary, in a case where the power key PW and the special key are pressed simultaneously, the CPU 101 determines that the user authentication by the authenticating function ends in success (step C2; YES), and moves the flow to the current position notifying mode. The power supply controlling function sends a power supply control signal to the power supply unit 112 to continue the power supply to the GPS receiving unit 105, the communication unit 106, the CPU 101, and the key operation section 113, so that the operations of the GPS receiving function and the position notifying function may be maintained in addition to the power on function and timer function (step C3).

In the current position notifying mode in which the GPS receiving function and position notifying function operate, the position notification controlling function obtains the current position from the GPS receiving unit 105 (step C4), reads out the information of the destination pre-designated as the contact address in case of emergency, and sends an emergency notification including the current position information to the destination (step C5).

Next, the CPU 101 determines whether or not a predetermined period (position information sending period Tm) has passed since the previous emergency notification was sent, by the timer function (step C6).

In a case where the position information sending period Tm has not passed (step C6; NO), the CPU 101 moves the flow to step C9 to determine whether or not the power is switched on. In a case it is determined that the power remains off, the CPU 101 moves the flow to step C6 to wait until the position information sending period Tm passes.

When the CPU 101 detects that the position information sending period Tm has passed (step C6; YES), the GPS receiving unit 105 receives a positioning signal again, and obtains the current position based on the positioning signal (step C4). Simultaneously, the position notification controlling function sends an emergency notification including the current position information again to the predetermined destination (step C5). Thereafter, the position notification controlling function repetitively sends an emergency notification each time the position information sending period Tm passes.

As explained above, according to the third embodiment, when the user presses the power key PW and the special key such as a call button or the like simultaneously, the position information obtained thereafter can be notified.

Fourth Embodiment

Figure 9:
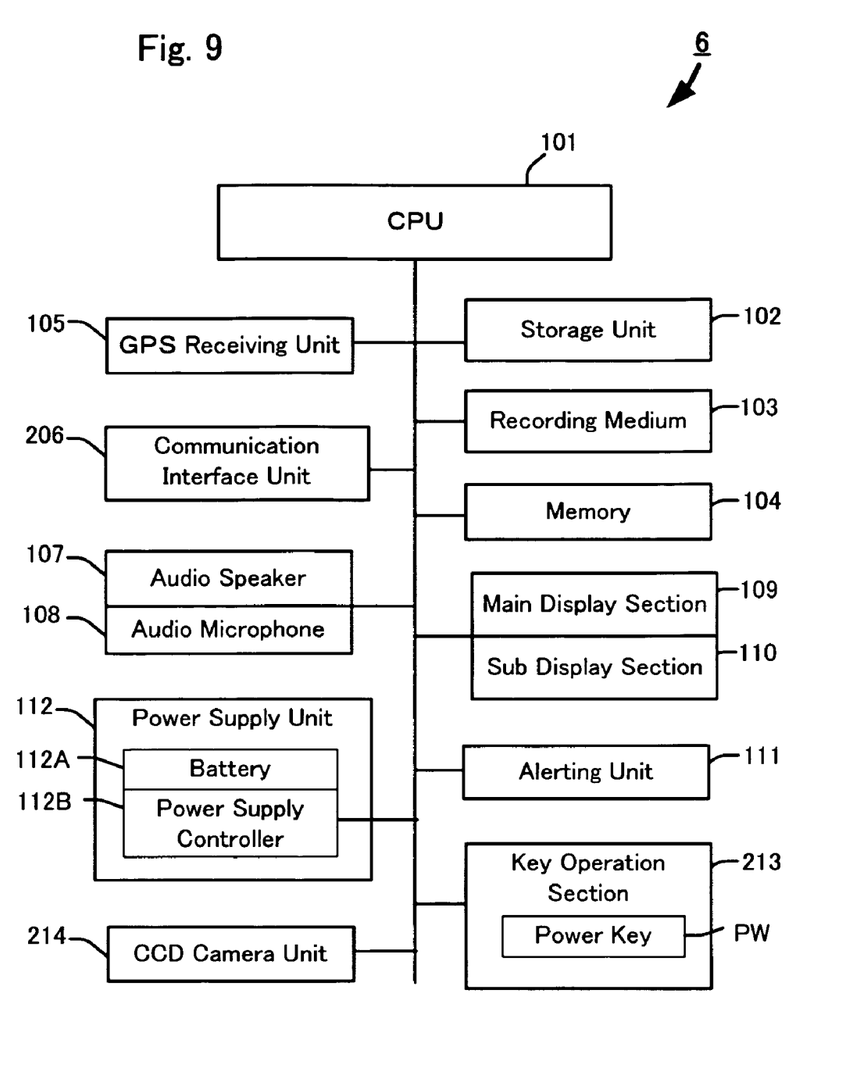
FIG. 9 is a block diagram showing basic elements of the PDA 6 employed in a fourth embodiment.

The fourth embodiment of the present invention will be explained by focusing mainly on the characteristic portions thereof, with reference to FIG. 1, FIG. 9, and FIG. 10. The elements which the fourth embodiment has in common with he first embodiment will be denoted by the same reference numerals.

The portable telephone apparatus 1 is adopted as a portable electronic apparatus in the first to third embodiments, but a PDA 6 will be adopted instead in the fourth embodiment.

The fourth embodiment shows an example that the condition determining function performs the user authentication by a vein pattern on the user's palm to determine whether or not the user authentication by the authenticating function is unsuccessful.

Specifically, the condition determining function performs the user authentication by comparing a vein pattern of the user detected by a later-described CCD camera 214 with a pre-registered vein pattern. A vein pattern on the palm of a proper user which is used for the user authentication is pre-registered in the data area of the storage unit 102.

According to the first to third embodiments, the process is started when the key operation section 113 detects a long pressing operation on the power key PW while the screen display is active. According to the fourth embodiment, the process is started after such a state occurs that the user gives no key operation for equal to or longer than a normal predetermined period (a state which occurs immediately before the screen display goes to a sleep state).

In the position notifying system PS shown in FIG. 1, the PDA 6 receives its current position by utilizing the GPS satellite 5. Further, likewise the portable telephone apparatus 1, the PDA 6 repetitively notifies the information indicating the current position by an e-mail to the PC 4 or portable telephone apparatus 7 at the predetermined destination through the Internet 3.

The PDA 6 comprises nearly the same elements as those of the portable telephone apparatus 1. Further, the PDA 6 has a condition determining function, a power supply controlling function, a current position notifying mode setting function, a position notification controlling function, a timer function, an image displaying function, etc., which correspond to the functions of the portable telephone apparatus 1.

Hereafter, the difference between the portable telephone apparatus 1 and the PDA 6 will be explained.

A communication interface unit 206 enables the PDA 6 to be connected to a wireless LAN (Local Area Network), a PHS (Personal Handyphone System) communication card, and a portable telephone apparatus. The PDA 6 can gain connection to a network such as the Internet, etc. through any of these. Likewise the portable telephone apparatus 1, the PDA 6 may employ a communication means having a communication function per se instead of the communication interface unit 206.

The CCD camera unit 214 is a camera for shooting an electronic digital image, and detects the vein pattern on the user's palm to be compared in the user authentication.

Figure 10:
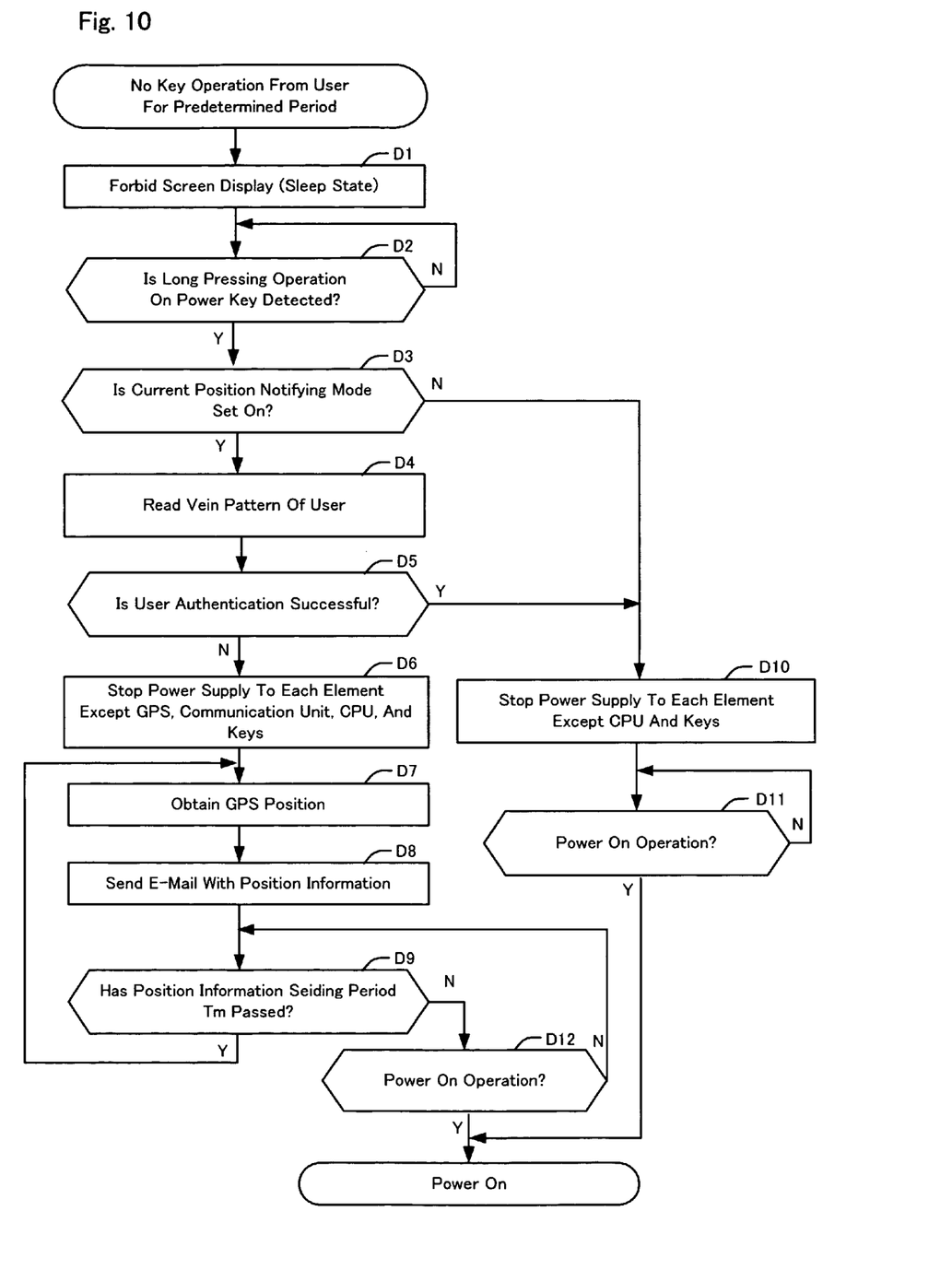
FIG. 10 is a flowchart showing an operation of the PDA 6 according to the fourth embodiment.

The process of the PDA 6 of the fourth embodiment is started from a state that the user gives no key operation for a predetermined period or longer, as shown in the flowchart of FIG. 10.

When the process of the flowchart of FIG. 10 is started, first, an image display controlling function sends a blackout signal to the image display sections 109 and 110 to bring the screen into a sleep state, in order to save the power consumption of the PDA 6 (step D1). Unless the user gives a long pressing operation on the power key PW after this (step D2; NO), the CPU 101 waits until the user give a long pressing operation on the power key PW at step D2. To the contrary, in a case where the user give a long pressing operation on the power key PW (step D2; YES), the CPU 101 determines whether or not the current position notifying mode is on or off (step D3).

Here, in a case where the current position notifying mode is not on (step D3; NO), the CPU 101 moves the flow to step D10 at which the power supply controlling function switches off the power, and then the CPU 101 waits until the user switches on the power (step D11).

In a case where the current position notifying mode is on (step D3; YES), the condition determining function performs the user authentication in order to determine whether or not the user authentication by the authenticating function is unsuccessful. At this time, when the condition determining function requests authentication information from the user, the user holds his/her palm over the CCD camera unit 214 to give an operation corresponding to the request, and the CCD camera 214 detects the vein pattern of the user (step D4).

Then, the condition determining unit compares the vein pattern detected by the CCD camera unit 214 with the pre-registered vein pattern to determine whether or not the user authentication by the authenticating function is unsuccessful (step D5).

In a case where the user authentication by the authenticating function is unsuccessful (step D5; NO), the CPU 101 moves the flow to steps D10 and D11. The power supply controlling function switches off the power (step D10) and the CPU 101 waits until the user switches on the power (step D11).

To the contrary, in a case where the user authentication by the authenticating function is successful (step D5; YES), the CPU 101 moves the flow to steps D7 to D9, where the position notification controlling function repetitively notifies the position information in the current position notifying mode.

Thereby, the operation of the PDA 6 is moved to the current position notifying mode in which the function for notifying the position is maintained, irrespective of whether the screen of the PDA 6 is in a display state or a non-display state.

According to the first to fourth embodiments, the position notifying function sends an emergency notification to the predetermined destination. However, the sending of the emergency notification may be arbitrarily set in accordance with what is needed, or the position notifying function may only register the position information to the telephone exchange 22 for mobile communication through a base station 21.

Further, notifications in arbitrary different forms may be sent in accordance with the result of the determination made by the condition determining function of whether or not the user authentication by the authenticating function is unsuccessful. In a case where a plurality of users use the portable electronic apparatus in common, each user may register his/her own authentication information in the data area of the storage unit 102.

The embodiments of the present invention have been described by mainly focusing on the combination of i) the power supply controlling function which operates by a long pressing operation on the power key PW, and ii) the authenticating function, in consideration of applications to the position tracking in case of emergency. In this case, even when an improper user gives a long pressing operation on the power key PW, the portable electronic apparatus can operate the position tracking function without the improper user noticing it, while seemingly disguising the power off state.

However, the concept of the present invention is to control display/non-display of the screen and to maintain/stop the position tracking function, by means of a result of determination obtained by one or more condition determining function(s), or by means of the combination of a result of determination obtained by one or more condition determining function(s) and a result of operation obtained by one or more power supply controlling function(s). Accordingly, as long as a power supply control instructing function or the authenticating function is realized by, for example, an operation of reading a contact or noncontact IC card, an operation of reading a magnetic card, or biometrics (fingerprint authentication, vein authentication, facial authentication, retina authentication, DNA authentication, voice print authentication, etc.), the embodiments of the present invention can be modified in various manners by arbitrarily utilizing the power supply control instructing function or the authenticating function.

Other than the above, the concept of the present invention can be applied not only to a portable telephone apparatus and a PDA with a communication function, but also to portable electronic apparatuses such as an electronic camera, an electronic wristwatch, an audio player, etc. which have a communication function.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-341539 filed on Nov. 28, 2005 and including specification, claims, drawings and summary. The disclosure of the above Japanese Patent Application is incorporated herein by reference in its entirety.

What is claimed is:

1. A portable electronic apparatus having a position notifying function, comprising:
a position detecting unit which detects a position of the portable electronic apparatus;
a sending unit which sends position information indicating the position detected by the position detecting unit;
a power off instructing unit which instructs switching off a power of the portable electronic apparatus;
an authenticating unit which authenticates a user;
a controlling unit which performs control such that the authenticating unit authenticates the user when the power off instructing unit instructs switching off the power, and the position detecting unit and the sending unit continue operating in a case where a result of authenticating coincides with a predetermined condition;
a continual alerting unit which notifies that authentication ends in failure, continually by an alert, when the authenticating unit fails in authentication; and
an alert stopping unit which alert by the continual alerting unit,
wherein in a case where the alert is not stopped by the alert stopping unit in a predetermined period after the continual alerting unit starts continual alerting, a notification is given to a pre-registered destination.

2. The portable electronic apparatus according to claim 1, comprising
a display section which displays data; and
a power supply unit which supplies operation power,
wherein in a case where the result of authenticating the user done by the authenticating unit when the power off instructing unit instructs switching off the power coincides with the predetermined condition, the controlling unit controls the power supply unit to stop supplying the operation power to the display section and continue supplying the operation power to the position detecting unit and the sending unit.

3. The portable electronic apparatus according to claim 1, wherein in a case where authentication of the user done by the authenticating unit when switching off the power is instructed is unsuccessful, the controlling unit controls the authenticating unit to again authenticate the user, and controls the position detecting unit and the sending unit to stop operating in a case where the authenticating unit succeeds in authenticating the user.

4. The portable electronic apparatus according to claim 1, wherein: the portable electronic apparatus comprises a mobile communication terminal which communicates with a base station;
the position detecting unit obtains position information indicating an administration area of which base station the portable electronic apparatus is positioned in;
the sending unit registers the position of the portable electronic apparatus to a telephone exchange of a mobile communication network through the base station which administers the area in which the portable electronic apparatus is positioned; and
in a case where the power off instructing unit instructs switching off the power and the result of authenticating done by the authenticating unit coincides with the predetermined condition, the controlling unit controls the sending unit to continue a registering operation to the telephone exchange even after switching off the power is instructed by the power off instructing unit.

5. The portable electronic apparatus according to claim 1, comprising
a position information sending unit which sends the position information indicating the position detected by the position detecting unit to a pre-registered destination,
wherein the position information sending unit sends the position information indicating the position detected by the position detecting unit to the pre-registered destination, in a case where the power off instructing unit instructs switching off the power and the result of authenticating done by the authenticating unit coincides with the predetermined condition.

6. The portable electronic apparatus according to claim 5, wherein the position information sending unit periodically notifies the position information to the pre-registered destination.

7. The portable electronic apparatus according to claim 5, wherein the position information sending unit comprises:
a unit which generates an e-mail including information for specifying a current position detected by the position detecting unit in a message, and destined to a predetermined address; and
a communication unit which sends the generated e-mail.

8. The portable electronic apparatus according to claim 1, wherein the authenticating unit comprises:
a living organism information reading unit which reads living organism information of the user; and
a unit which authenticates the user based on the living organism information read by the living organism information reading unit.

9. The portable electronic apparatus according to claim 8, wherein: the power off instructing unit comprises an operation section operated by the user; and
the living organism information reading unit is arranged at the operation section.

10. The portable electronic apparatus according to claim 1, further comprising
a keyboard,
wherein the authenticating unit authenticates the user based on a plurality of keys which are operated, among keys provided on the keyboard.

11. The portable electronic apparatus according to claim 1, wherein the result of authenticating coincides with the predetermined condition when the authenticating unit fails in authenticating the user.

12. The portable electronic apparatus according to claim 11,
wherein the controlling unit controls the sending unit to send information for specifying the position detected by the position detecting unit and information indicating that the power is switched off by someone other than the user.

13. The portable electronic apparatus according to claim 1, wherein the authenticating unit comprises a unit which notifies the result of authenticating by an alert.

14. The portable electronic apparatus according to claim 1, wherein the portable electronic apparatus comprises a mobile communication terminal apparatus which exchanges an audio signal and a data signal with another apparatus through a base station.

15. A non-transitory computer-readable recording medium tangibly storing a program for allowing a computer to realize:
a function for determining whether or not an authentication result coincides with a predetermined condition;
a function for, when the authentication result coincides with the predetermined condition, performing control of letting a position detecting unit and a sending unit continue operating and controlling a power supply unit to stop supplying operation power to a display section but to continue supplying operation power to the position detecting unit and the sending unit;
a function of authenticating a user;
a function of producing a continual alert which notifies when authentication ends in failure;
a function of stopping the continual alert; and
a function for, in a case where the alert is not stopped in a predetermined period after the continual alert starts, giving a notification to a pre-registered destination.

16. A communication system comprising a mobile communication network having a plurality of base stations and a telephone exchange, and a portable electronic apparatus which communicates with another apparatus through the mobile communication network,
wherein the portable electronic apparatus comprises: a base station determining unit which determines with which base station the portable electronic apparatus establishes communication; a sending unit which sends information for specifying the portable electronic apparatus to the base station determined by the base station determining unit; a power off instructing unit which instructs switching off a power of the portable electronic apparatus; an authenticating unit which authenticates a user; a controlling unit which controls the base station determining unit and the sending unit to continue operating when a result of authenticating the user performed by the authenticating unit when the power off instructing unit instructs switching off the power coincides with a predetermined condition; a continual alerting unit which notifies that authentication ends in failure, continually by an alert, when the authenticating unit fails in authentication; and an alert stopping unit which stops the alert by the continual alerting unit,
wherein the base station comprises a unit which provides and registers to the telephone exchange, identification information of a portable electronic apparatus which establishes communication with the base station,
wherein in a case where authentication done when switching off the power is instructed ends in failure, the portable electronic apparatus continues an operation of registering its position to the telephone exchange even after the power is switched off, and
wherein in a case where the alert is not stopped by the alert stopping unit in a predetermined period after the continual alerting unit starts continual alerting, a notification is given to a pre-registered destination.

* * * * *